US011686266B2

(12) United States Patent
Takahashi et al.

(10) Patent No.: US 11,686,266 B2
(45) Date of Patent: Jun. 27, 2023

(54) CONTROLLER FOR INTERNAL COMBUSTION ENGINE

(71) Applicant: Mitsubishi Electric Corporation, Tokyo (JP)

(72) Inventors: Tatsuhiko Takahashi, Hyogo (JP); Keiichi Arita, Tokyo (JP); Kazuyo Kako, Tokyo (JP); Yuhei Matsushima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/699,257

(22) Filed: Mar. 21, 2022

(65) Prior Publication Data
US 2022/0397074 A1   Dec. 15, 2022

(30) Foreign Application Priority Data

Jun. 9, 2021   (JP) .............................. JP2021-096322

(51) Int. Cl.
*F02D 41/24*   (2006.01)
*F02D 41/00*   (2006.01)
*F02D 35/02*   (2006.01)

(52) U.S. Cl.
CPC ....... *F02D 41/2451* (2013.01); *F02D 41/009* (2013.01); *F02D 41/2416* (2013.01);
(Continued)

(58) Field of Classification Search
CPC ....... F02D 2200/1004; F02D 2200/101; F02D 2200/1012; F02D 41/009; F02D 41/2451;
(Continued)

(56) References Cited

U.S. PATENT DOCUMENTS 5,717,133 A * 2/1998 Wu ........................ G01M 15/11
123/436
6,644,273 B1 * 11/2003 Hagari .................. F02D 41/009
123/406.62
(Continued)

FOREIGN PATENT DOCUMENTS

JP   2001200747 A  *  7/2001
JP   2008069692 A  *  3/2008
(Continued)

OTHER PUBLICATIONS

Communication dated Jul. 26, 2022 from the Japanese Patent Office in Application No. 2021-096322.

*Primary Examiner* — John M Zaleskas
(74) *Attorney, Agent, or Firm* — Sughrue Mion, PLLC; Richard C. Turner (57) ABSTRACT

To provide a controller for internal combustion engine which can improve the estimation accuracy of the period in the chipped tooth section, even if the period is suddenly varied in the chipped tooth section. A controller for internal combustion engine detects a period when the tooth passes, based on an output signal of the crank angle sensor; determines a period corresponding to the chipped tooth section; determines a crank angle corresponding to the passed tooth; and estimates a period of a virtual unit angle interval when assuming that the tooth is provided at the unit angle interval in the chipped tooth section, based on the period of the chipped tooth section, the period before the chipped tooth section, and the period after the chipped tooth section.

3 Claims, 8 Drawing Sheets

(52) U.S. Cl.
CPC ...... *F02D 35/028* (2013.01); *F02D 2200/024* (2013.01); *F02D 2200/1004* (2013.01); *F02D 2200/1012* (2013.01)

(58) Field of Classification Search
CPC . F02D 41/2474; G01M 15/046; G01M 15/06; G01M 15/08
See application file for complete search history.

(56) References Cited

U.S. PATENT DOCUMENTS

| | | | | |
|---|---|---|---|---|
| 11,261,814 B1* | 3/2022 | Uphues | .................... | F02D 41/38 |
| 2001/0032049 A1* | 10/2001 | Ando | .................... | F02D 41/009 |
| | | | | 123/406.6 |
| 2002/0026825 A1* | 3/2002 | Namari | ............... | G01M 15/046 |
| | | | | 73/114.28 |
| 2002/0125880 A1* | 9/2002 | Murai | ..................... | G01P 3/488 |
| | | | | 702/145 |
| 2003/0037767 A1* | 2/2003 | Breitegger | ............ | F02D 41/009 |
| | | | | 73/114.16 |
| 2004/0000190 A1* | 1/2004 | Hori | ...................... | G01M 15/06 |
| | | | | 73/114.27 |
| 2004/0083800 A1* | 5/2004 | Yonezawa | ................. | F01L 1/34 |
| | | | | 73/114.26 |
| 2004/0089272 A1* | 5/2004 | Kanazawa | ............ | F02D 41/062 |
| | | | | 123/406.6 |
| 2004/0182142 A1* | 9/2004 | Nakamura | ........... | G01D 5/2457 |
| | | | | 73/114.26 |
| 2005/0096865 A1* | 5/2005 | Sugiura | ................. | F02D 41/009 |
| | | | | 702/151 |
| 2007/0044548 A1* | 3/2007 | Ishizuka | ................. | F02D 41/22 |
| | | | | 73/114.26 |
| 2007/0175272 A1* | 8/2007 | Kondo | .................. | F02D 41/222 |
| | | | | 73/114.26 |
| 2008/0189024 A1* | 8/2008 | Kondo | .................. | F02D 41/009 |
| | | | | 701/102 |
| 2009/0282903 A1* | 11/2009 | Nagano | ................... | G01P 3/489 |
| | | | | 73/114.15 |
| 2010/0018299 A1* | 1/2010 | Takeuchi | .............. | F02D 41/009 |
| | | | | 73/114.26 |
| 2013/0151194 A1* | 6/2013 | Hawken | .............. | F02D 41/2425 |
| | | | | 33/1 PT |
| 2017/0167950 A1* | 6/2017 | Soneda | ............ | F02D 41/2416 |
| 2017/0204795 A1* | 7/2017 | Hagari | ............ | F02D 41/1497 |
| 2017/0292466 A1* | 10/2017 | Hagari | .................. | F02D 41/009 |
| 2018/0080396 A1* | 3/2018 | Marconato | .......... | F02D 41/2451 |
| 2018/0087459 A1* | 3/2018 | Hagari | ...................... | G01L 3/04 |
| 2018/0340504 A1* | 11/2018 | Enomoto | ............ | B60W 30/192 |
| 2019/0178191 A1* | 6/2019 | Hagari | .................. | F02D 35/024 |
| 2022/0220910 A1* | 7/2022 | Matsushima | ....... | F02D 13/0215 |
| 2022/0333538 A1* | 10/2022 | Matsushima | ........... | F02P 15/02 |
| | | | | 324/393 |
| 2022/0333544 A1* | 10/2022 | Matsushima | ........... | G01P 3/489 |
| | | | | 73/114.15 |

FOREIGN PATENT DOCUMENTS

| | | | | |
|---|---|---|---|---|
| JP | 2009-275618 A | | 11/2009 | |
| JP | 2013113242 A | * | 6/2013 | |
| JP | 2015081563 A | * | 4/2015 | |
| JP | 6237303 B2 | | 11/2017 | |
| KR | 20020095664 A | * | 12/2002 | |
| WO | WO-2016207004 A1 | * | 12/2016 | ........... F02D 41/009 |

* cited by examiner

FIG. 9

US 11,686,266 B2

CONTROLLER FOR INTERNAL COMBUSTION ENGINE

INCORPORATION BY REFERENCE

The disclosure of Japanese Patent Application No. 2021-96322 filed on Jun. 9, 2021 including its specification, claims and drawings, is incorporated herein by reference in its entirety.

BACKGROUND

The present disclosure relates to a controller for internal combustion engine.

In order to improve the fuel consumption performance and the emission performance of the internal combustion engine, the method of measuring the combustion state of the internal combustion engine and carrying out feedback control of the measuring result is effective. For that purpose, it is important to measure the combustion state of the internal combustion engine accurately. It is known widely that the combustion state of the internal combustion engine can be measured accurately by measuring a cylinder pressure. As the measurement method of cylinder pressure, besides the method of measuring directly based on the cylinder pressure sensor signal, there is the method of estimating the gas pressure torque based on the information on each mechanism of the internal combustion engine, such as the crank angle signal.

As the conventional technology, for example, JP 6237303 B discloses the method to detect the crank angle based on the output signal of the crank angle sensor. In the technology of JP 6237303 B, by predicting the period of the chipped tooth section based on the three past periods before the chipped tooth section, the crank angle is detected also in the chipped tooth section.

SUMMARY

However, in the technology of JP 6237303 B, since only the period variation before the chipped tooth section is considered, if the period is suddenly varied in the chipped tooth section, the estimation accuracy of the period in the chipped tooth section is deteriorated.

Then, the purpose of the present disclosure is to provide a controller for internal combustion engine which can improve the estimation accuracy of the period in the chipped tooth section, even if the period is suddenly varied in the chipped tooth section.

A controller for internal combustion engine according to the present disclosure that controls an internal combustion engine which is provided with a detected unit which has a plurality of teeth at a preliminarily set unit angle interval with a chipped tooth section and rotates integrally with a crankshaft, and a crank angle sensor which detects the tooth, the controller for internal combustion engine, including:

an angle information detection unit that detects a period when the tooth passes, based on an output signal of the crank angle sensor, determines a period corresponding to the chipped tooth section, and determines a crank angle corresponding to the passed tooth; and a chipped tooth period estimation unit that estimates a period of a virtual unit angle interval when assuming that the tooth is provided at the unit angle interval in the chipped tooth section, based on the period of the chipped tooth section, the period before the chipped tooth section, and the period after the chipped tooth section.

According to the controller for internal combustion engine of the present disclosure, since the period of the virtual unit angle interval of the chipped tooth section is estimated using not only the period before the chipped tooth section but also the period after the chipped tooth section, even if the period is suddenly varied in the chipped tooth section, it can be estimated with good accuracy.

DETAILED DESCRIPTION OF THE EMBODIMENTS

1. Embodiment 1

Figure 1:
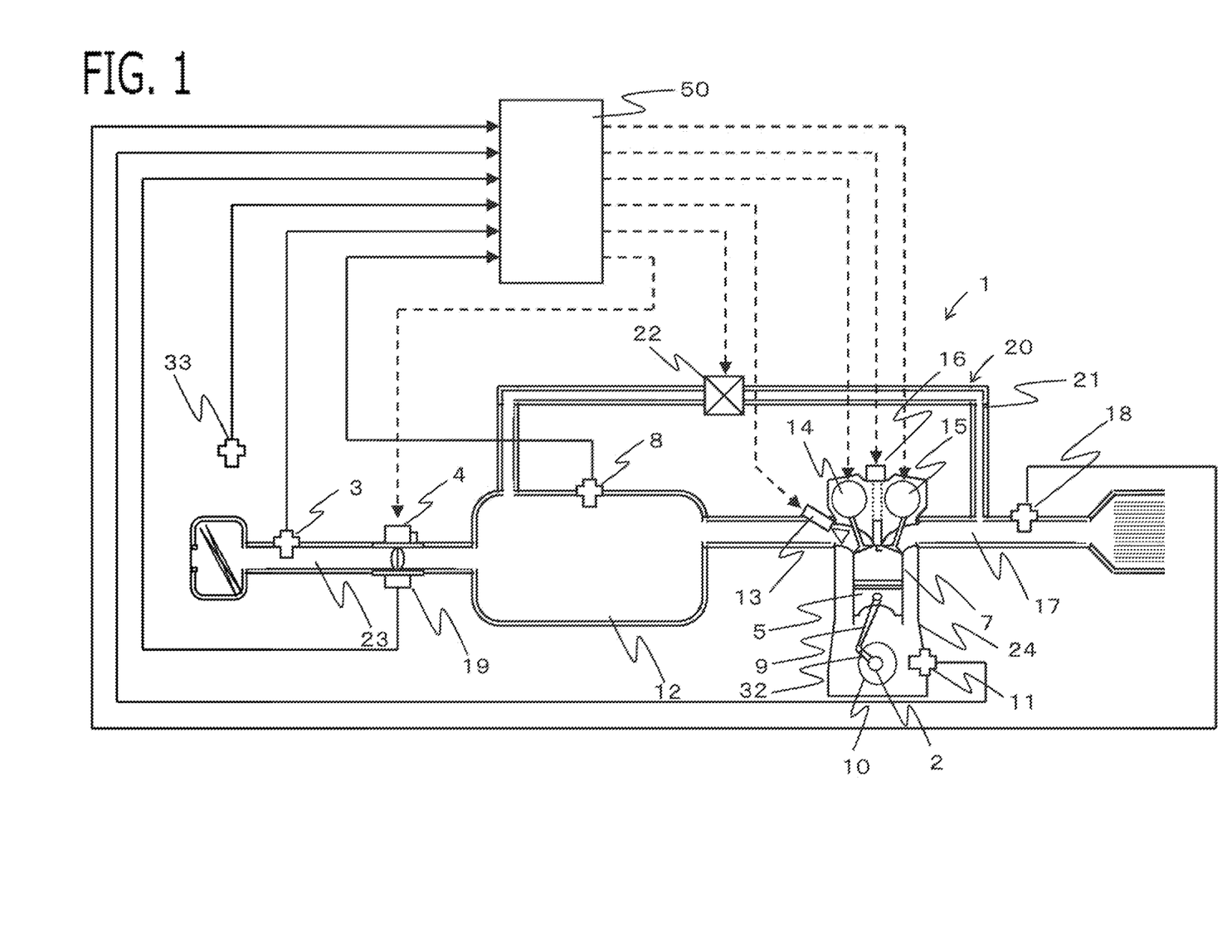
FIG. 1 is a schematic configuration diagram of the internal combustion engine and the controller according to Embodiment 1.
Figure 2:
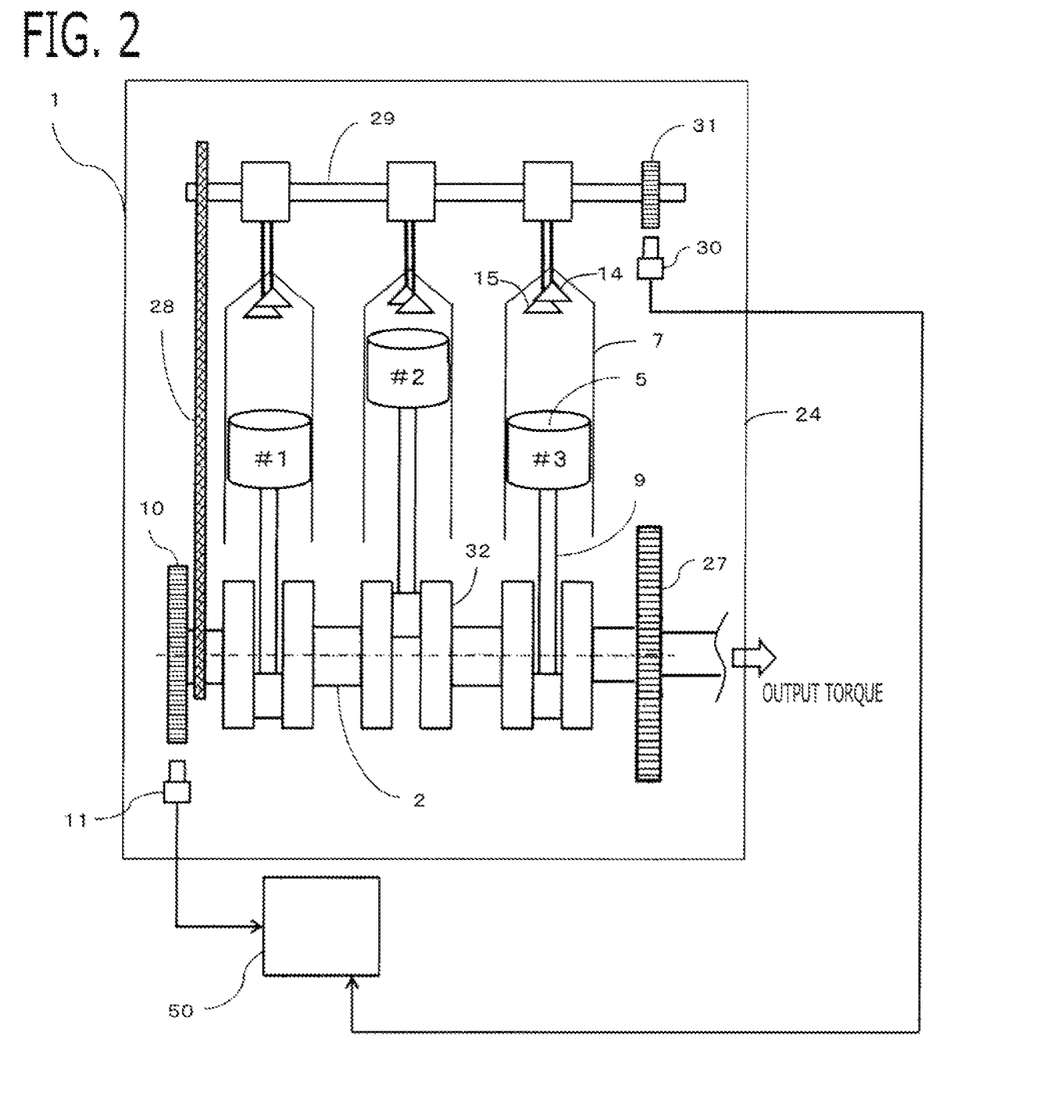
FIG. 2 is a schematic configuration diagram of the internal combustion engine and the controller according to Embodiment 1.
Figure 3:
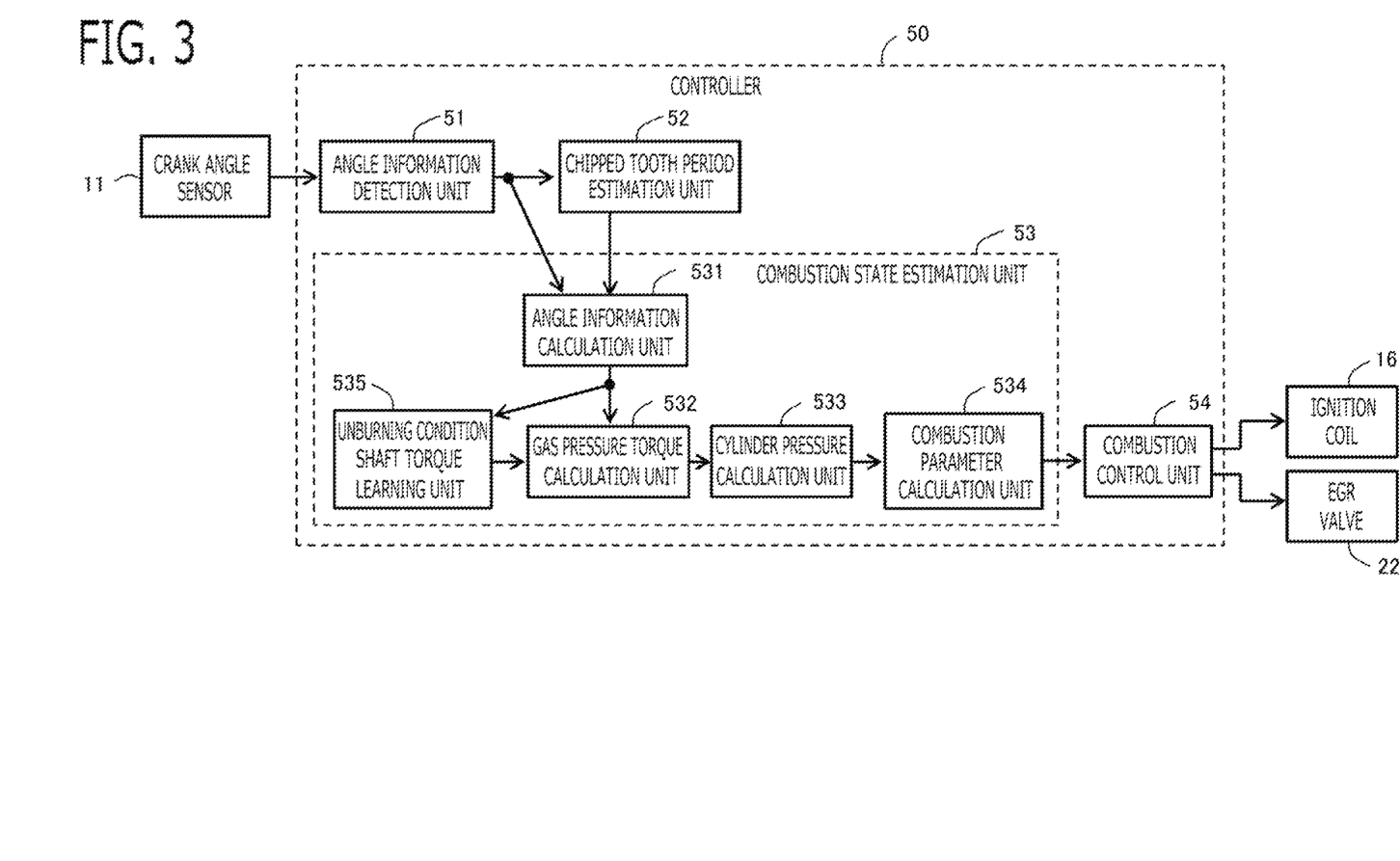
FIG. 3 is a block diagram of the controller according to Embodiment 1.

A controller 50 for internal combustion engine (hereinafter, referred to simply as the controller 50) according to Embodiment 1 will be explained with reference to the drawings. FIG. 1 and FIG. 2 are a schematic configuration diagram of the internal combustion engine 1 and the controller 50; FIG. 3 is a block diagram of the controller 50 according to Embodiment 1. The internal combustion engine 1 and the controller 50 are mounted in a vehicle, and the internal combustion engine 1 functions as a driving-force source for the vehicle (wheels).

1-1. Configuration of Internal Combustion Engine 1

The configuration of the internal combustion engine 1 will be explained. As shown in FIG. 1, the internal combustion engine 1 is provided with cylinders 7 in which a fuel-air mixture is combusted. The internal combustion engine 1 is provided with an intake path 23 for supplying air to the cylinders 7 and an exhaust path 17 for discharging exhaust gas from the cylinders 7. The internal combustion engine 1 is a gasoline engine. The internal combustion engine 1 is provided with a throttle valve 4 which opens and closes the intake path 23. The throttle valve 4 is an electronically controlled throttle valve which is opening/closing-driven by an electric motor controlled by controller 50. A throttle position sensor 19 which outputs an electric signal according to the opening degree of the throttle valve 4 is provided in the throttle valve 4.

An air flow sensor 3 which outputs an electric signal according to an intake air amount taken into the intake path 23 is provided in the intake path 23 on the upstream side of throttle valve 4. The internal combustion engine 1 is provided with an exhaust gas recirculation apparatus 20. The exhaust gas recirculation apparatus 20 has an EGR passage 21 which recirculates the exhaust gas from the exhaust path 17 to the intake manifold 12, and an EGR valve 22 which opens and closes the EGR passage 21. The intake manifold 12 is a part of the intake path 23 on the downstream side of the throttle valve 4. The EGR valve 22 is an electronic controlled EGR valve which is opening/closing-driven by an electric motor controlled by controller 50. An air-fuel ratio sensor 18 which outputs an electric signal according to an air-fuel ratio of exhaust gas in the exhaust path 17 is provided in the exhaust path 17.

A manifold pressure sensor 8 which outputs an electric signal according to a pressure in the intake manifold 12 is provided in the intake manifold 12. An injector 13 for injecting a fuel is provided on the downstream side part of the intake manifold 12. The injector 13 may be provided so as to inject a fuel directly into the cylinder 7. An atmospheric pressure sensor 33 which outputs an electric signal according to an atmospheric pressure is provided in the internal combustion engine 1.

An ignition plug for igniting a fuel-air mixture and an ignition coil 16 for supplying ignition energy to the ignition plug are provided on the top of the cylinder 7. An intake valve 14 for adjusting the amount of intake air to be taken from the intake path 23 into the cylinder 7 and an exhaust valve 15 for adjusting the amount of exhaust gas to be exhausted from the cylinder to the exhaust path 17 are provided on the top of the cylinder 7. The intake valve 14 is provided with an intake variable valve timing mechanism which makes the opening and closing timing thereof variable. The exhaust valve 15 is provided with an exhaust variable valve timing mechanism which makes the opening and closing timing thereof variable. Each of the variable valve timing mechanisms 14, 15 has an electric actuator.

As shown in FIG. 2, the internal combustion engine 1 has a plurality of cylinders 7 (in this example, three). A piston 5 is provided inside of the each cylinder 7. The piston 5 of each cylinder 7 is connected to a crankshaft 2 via a connecting rod 9 and a crank 32. The crankshaft 2 is rotated by reciprocating movement of the piston 5. A combustion gas pressure generated in each cylinder 7 presses the top face of the piston 5, and rotates the crankshaft 2 via the connecting rod 9 and the crank 32. The crankshaft 2 is connected with a power transfer mechanism which transmits driving force to the wheels. The power transfer mechanism is provided with a gearbox, a differential gear, and the like. The vehicle provided with the internal combustion engine 1 may be a hybrid vehicle provided with a motor generator in the power transfer mechanism.

The internal combustion engine 1 is provided with a signal plate 10 which rotates integrally with the crankshaft 2. A signal plate 10 is provided with a plurality of teeth at a preliminarily set unit angle interval $\Delta\theta ut$ with a chipped tooth section. The signal plate 10 corresponds to a detected unit of the present disclosure. In the present embodiment, the unit angle interval $\Delta\theta ut$ is set to 10 degrees. In the chipped tooth section, two teeth are chipped, and the chipped tooth section become 30 degrees. The unit angle interval $\Delta\theta ut$ may be set to any angles. A number of chipped tooth M of the chipped tooth section may be set to any number, and a number of the chipped tooth section may be set to any number. The internal combustion engine 1 is provided with a crank angle sensor 11 which is fixed to an engine block 24 and detects the tooth of the signal plate 10.

The internal combustion engine 1 is provided with a cam shaft 29 connected with crankshaft 2 via a chain 28. The camshaft 29 carries out the opening-and-closing drive of the intake valve 14 and the exhaust valve 15. During the crankshaft 2 rotates two times, the cam shaft 29 rotates once. The internal combustion engine 1 is provided with a signal plate 31 for cam which rotates integrally with the cam shaft 29. A plurality of teeth are provided in the signal plate 31 for cam at a plurality of preliminarily set cam shaft angles. The internal combustion engine 1 is provided with a cam angle sensor 30 which is fixed to an engine block 24 and detects the tooth of signal plate 31 for cam.

Based on two kinds of output signals of the crank angle sensor 11 and the cam angle sensor 30, the controller 50 detects the crank angle on the basis of the top dead center of each piston 5 and determines the stroke of each cylinder 7. The internal combustion engine 1 is a 4-stroke engine which has an intake stroke, a compression stroke, a combustion stroke, and an exhaust stroke.

Each of the crank angle sensor 11 and the cam angle sensor 30 outputs an electric signal according to change of the distance between each sensor and tooth by rotation of the crankshaft 2. The output signal of each angle sensor 11, 30 becomes a rectangular wave that a signal turns on or off when the distance between sensor and tooth is near or when the distance is far. An electromagnetic pickup type sensor is used for each angle sensor 11, 30, for example.

1-2. Configuration of Controller 50

Figure 4:
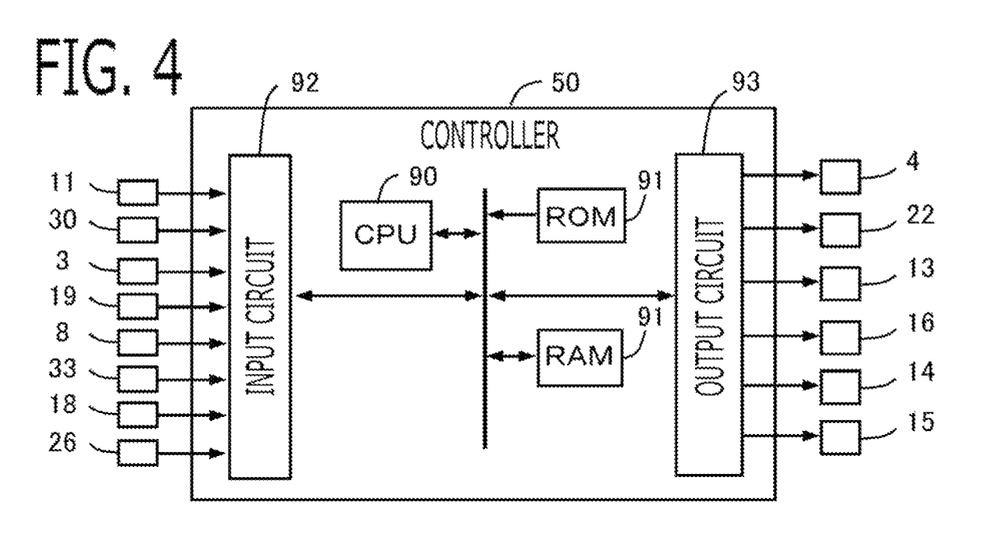
FIG. 4 is a hardware configuration diagram of the controller according to Embodiment 1.

Next, the controller 50 will be explained. The controller 50 is the one whose control object is the internal combustion engine 1. As shown in FIG. 3, the controller 50 is provided with processing units, such as an angle information detection unit 51, a chipped tooth period estimation unit 52, a combustion state estimation unit 53, a combustion control unit 54, and the like. The respective processing units 51 to 54 of the controller 50 are realized by processing circuits provided in the controller 50. Specifically, as shown in FIG. 4, the controller 50 is provided with, as a processing circuit, an arithmetic processor (computer) 90 such as a CPU (Central Processing Unit), storage apparatuses 91 which exchange data with the arithmetic processor 90, an input circuit 92 which inputs external signals to the arithmetic processor 90, an output circuit 93 which outputs signals from the arithmetic processor 90 to the outside, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed.

As the storage apparatus 91, volatile and nonvolatile storage apparatuses, such as RAM (Random Access Memory), ROM (Read Only Memory), and EEPROM (Electrically Erasable Programmable ROM), are provided. The input circuit 92 is connected with various kinds of sensors and switches and is provided with an A/D converter and the like for inputting output signals from the sensors and the switches to the arithmetic processor 90. The output circuit 93 is connected with electric loads and is provided with a driving circuit and the like for outputting a control signal from the arithmetic processor 90.

Then, the arithmetic processor 90 runs software items (programs) stored in the storage apparatus 91 such as a ROM and collaborates with other hardware devices in the controller 50, such as the storage apparatus 91, the input circuit 92, and the output circuit 93, so that the respective functions of the processing units 51 to 54 provided in the controller 50 are realized. Setting data items such as the first threshold value, the second threshold value, the filter coefficient, and the unburning condition data to be used in the processing units 51 to 54 are stored, as part of software items (programs), in the storage apparatus 91 such as ROM and EEPROM. Each calculation value and each detection value, such as the crank angle $\theta d$, the period $\Delta T$, the period $\Delta T$ute of the virtual unit angle interval, the crank angle speed $\omega d$, the crank angle acceleration $\alpha d$, the actual shaft torque Tcrkd, the increment of gas pressure torque by burning $\Delta T$gas_brn, and the gas pressure in cylinder in burning Pcyl_brn, which are calculated by each processing unit 51 to 54, are stored in the storage apparatus 91, such as RAM.

In the present embodiment, the input circuit 92 is connected with the crank angle sensor 11, the cam angle sensor 30, the air flow sensor 3, the throttle position sensor 19, the manifold pressure sensor 8, the atmospheric pressure sensor 33, the air fuel ratio sensor 18, an accelerator position sensor 26, and the like. The output circuit 93 is connected with the throttle valve 4 (electric motor), the EGR valve 22 (electric motor), the injector 13, the ignition coil 16, the intake-air variable valve timing mechanism 14, the exhaust-gas variable valve timing mechanism 15, and the like. The controller 50 is connected with various kinds of unillustrated sensors, switches, actuators, and the like. The controller 50 detects operating conditions of the internal combustion engine 1, such as an intake air amount, a pressure in the intake manifold, an atmospheric pressure, an air-fuel ratio, and an accelerator opening degree, based on the output signals of various sensors.

As basic control, the controller 50 calculates a fuel injection amount, an ignition timing, and the like, based on inputted output signals and the like from the various kinds of sensors, and then performs driving control of the injector 13, the ignition coil 16, and the like. Based on the output signal of the accelerator position sensor 26 and the like, the controller 50 calculates an output torque of the internal combustion engine 1 demanded by the driver, and then controls the throttle valve 4 and the like so that an intake air amount for realizing the demanded output torque is obtained. Specifically, the controller 50 calculates a target throttle opening degree and then performs driving control of the electric motor of the throttle valve 4 so that the throttle opening degree which is detected based on the output signal of the throttle position sensor 19 approaches the target throttle opening degree. And, the controller 50 calculates a target opening degree of the EGR valve 22 based on inputted output signals and the like from the various kinds of sensors and then performs driving control of the electric motor of the EGR valve 22. The controller 50 calculates a target opening and closing timing of the intake valve and a target opening and closing timing of the exhaust valve based on the output signals of the various sensors, and performs driving control of the intake and the exhaust variable valve timing mechanisms 14, 15 based on each target opening and closing timing.

1-2-1. Angle Information Detection Unit 51

The angle information detection unit 51 detects a period $\Delta T$ when the tooth passes, based on the output signal of the crank angle sensor 11, determines a period $\Delta T$ corresponding to the chipped tooth section, and determines a crank angle $\theta d$ corresponding to the passed tooth.

Figure 5:
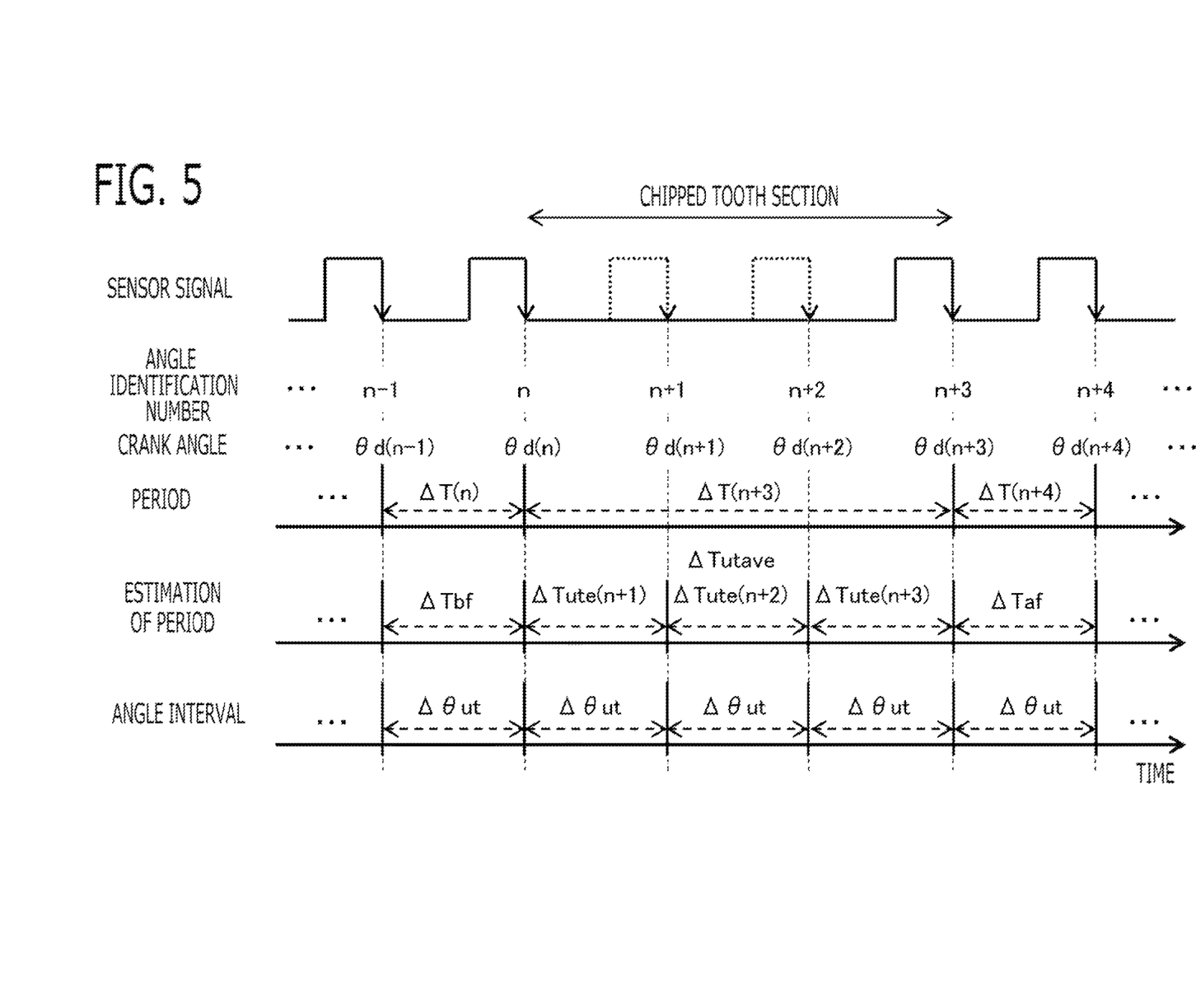
FIG. 5 is a time chart for explaining the angle information according to Embodiment 1.

In the present embodiment, as shown in FIG. 5, the angle information detection unit 51 determines that the tooth passed, when the falling edge (or the rising edge) of the output signal (rectangular wave) of the crank angle sensor 11 is detected. Then, the angle information detection unit 51 detects a time interval from a time point when detecting a passage of the tooth (the falling edge) last time to a time point when detecting a passage of the tooth (the falling edge) this time, as this time period $\Delta T$.

The angle information detection unit 51 determines the period $\Delta T$ which becomes longer than other period $\Delta T$ by a predetermined ratio or more among the detected periods $\Delta T$ for one rotation, as the period $\Delta T$ corresponding to the chipped tooth section. Since the crank angle corresponding to the chipped tooth section is preliminarily set, the angle information detection unit 51 determines the crank angle $\theta d$ of each time point when the falling edge was detected, based on the crank angle of the chipped tooth section.

The angle information detection unit 51 determines the stroke of each cylinder 7 corresponding to each crank angle, based on the output signal of the cam angle sensor 30.

The angle information detection unit 51 stores the angle information detected during a storage period, such as the period $\Delta T$ and the crank angle $\theta d$, to the storage apparatus 91, such as RAM, correlating with the angle identification number n. For example, the angle information detection unit 51 sets the angle identification number n at the time point when detecting the first falling edge after the top dead center to 1; and after that, every time when detecting the falling edge, increases the angle identification number n by 1 in the section other than the chipped tooth section, and increases the angle identification number n by a value obtained by adding 1 to the number of chipped tooth M (in this example, 2) in the chipped tooth section. The angle identification number n returns to 1 after the maximum number (in this example, 36).

1-2-2. Chipped Tooth Period Estimation Unit 52

The chipped tooth period estimation unit 52 estimates a period $\Delta T$ute of a virtual unit angle interval when assuming that the tooth is provided at the unit angle interval $\Delta\theta$ut in the chipped tooth section, based on the period $\Delta T$ of the chipped tooth section, the period $\Delta T$bf before the chipped tooth section, and the period $\Delta T$af after the chipped tooth section.

According to this configuration, since the period $\Delta T$ute of the virtual unit angle interval of the chipped tooth section is estimated using not only the period $\Delta T$bf before the chipped tooth section but also the period $\Delta T$af after the chipped tooth section, even if a period variation occurs in the chipped tooth section, it can be estimated with good accuracy.

Figure 6:
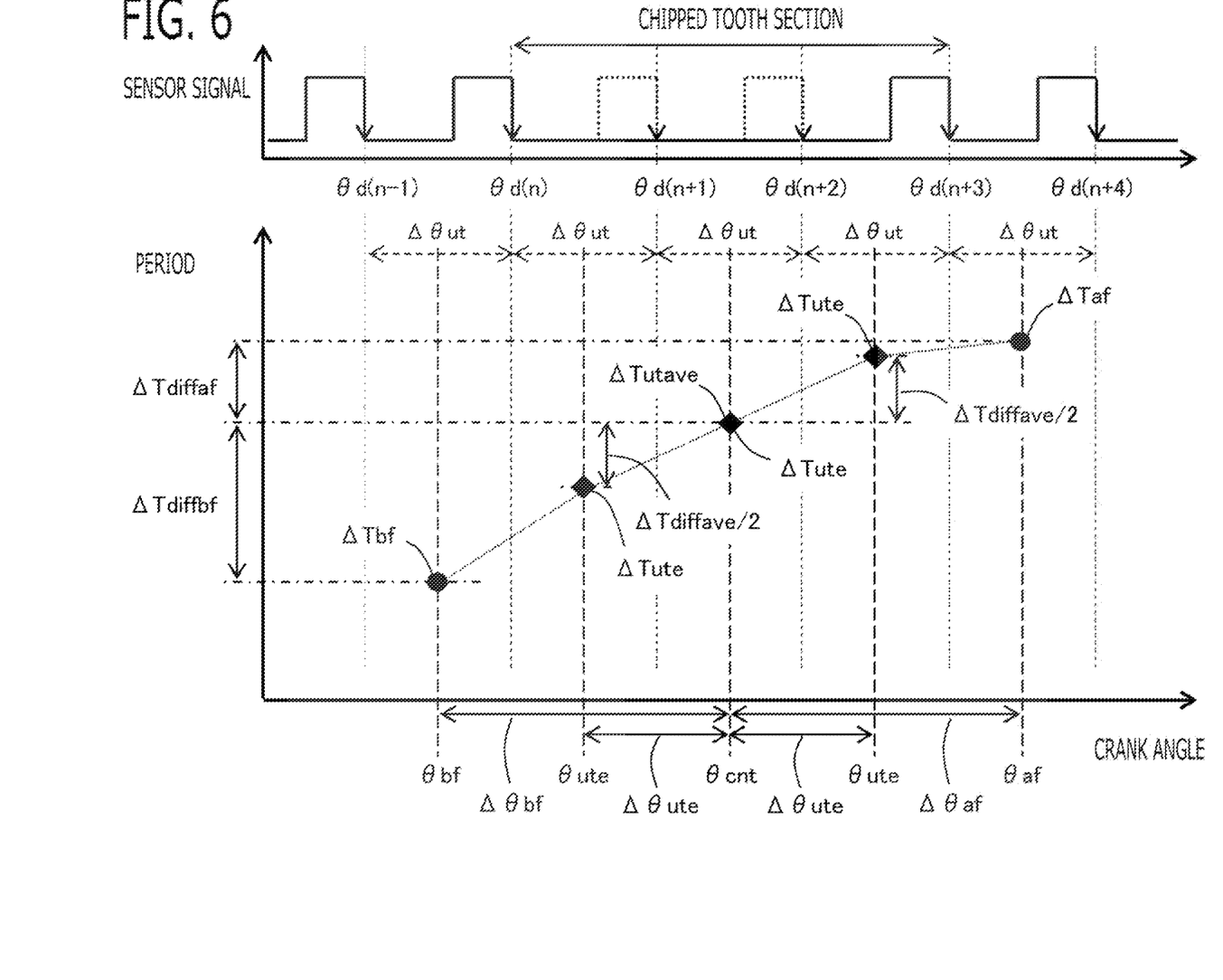
FIG. 6 is a figure for explaining the period estimation of the chipped tooth section according to Embodiment 1.

In the present embodiment, as shown in the next equation and FIG. 6, the chipped tooth period estimation unit 52 calculates an average period $\Delta T$utave of the virtual unit angle interval in the chipped tooth section, by dividing the period $\Delta T$ of the chipped tooth section by a value (in this example, 3) obtained by adding 1 to the number of chipped tooth M. This average period $\Delta T$utave of the virtual unit angle interval is corresponded to a central angle $\theta$cnt of the chipped tooth section. Then, the chipped tooth period estimation unit 52 estimates the period $\Delta T$ute of the virtual unit angle interval in the chipped tooth section, by an approximate line which passes the period $\Delta T$bf before the chipped tooth section, the average period $\Delta T$utave of the virtual unit angle interval at the central angle $\theta$cnt of the chipped tooth section, and the period $\Delta T$af after the chipped tooth section.

$$\Delta Tutave = \Delta T/(M+1) \quad (1)$$

The period $\Delta T$bf before the chipped tooth section is a period detected just before the chipped tooth section, and corresponds to a time interval of the angle interval between two falling edges just before the chipped tooth section. The period ΔTaf after the chipped tooth section is a period detected just after the chipped tooth section, and corresponds to a time interval of the angle interval between two falling edges just after the chipped tooth section.

According to this configuration, the average period ΔTutave of the virtual unit angle interval in the chipped tooth section is corresponded to the central angle θcnt of the chipped tooth section. And, by the approximate line which passes the periods ΔTbf, ΔTutave, ΔTaf of the unit angle interval of three points of before, center, and after of the chipped tooth section, a plurality of periods ΔTute of the unit angle interval in the chipped tooth section can be estimated with good accuracy.

<Estimation Using Difference Average Value>

In the present embodiment, as shown in the next equation, the chipped tooth period estimation unit 52 calculates a former difference ΔTdiffbf by subtracting the period ΔTbf before the chipped tooth section from the average period ΔTutave of the virtual unit angle interval at the central angle θcnt of the chipped tooth section; calculates a later difference ΔTdiffaf by subtracting the average period ΔTutave of the virtual unit angle interval at the central angle of the chipped tooth section from the period ΔTaf after the chipped tooth section; and calculates a difference average value ΔTdiffave between the former difference ΔTdiffbf and the later difference ΔTdiffaf.

$$\Delta Tdiffbf = \Delta Tutave - \Delta Tbf$$

$$\Delta Tdiffaf = \Delta Taf - \Delta Tutave$$

$$\Delta Tdiffave = (\Delta Tdiffbf + \Delta Tdiffaf)/2 \tag{2}$$

Then, about the chipped tooth section before the central angle θcnt of the chipped tooth section, as shown in the next equation and FIG. 6, the chipped tooth period estimation unit 52 calculates an angle ratio Rθute, by dividing an angular difference Δθute obtained by subtracting a central angle θute of the virtual unit angle interval for estimating a period from the central angle θcnt of the chipped tooth section, by an angular difference Δθbf obtained by subtracting the central angle θbf of the period before the chipped tooth section from the central angle θcnt of the chipped tooth section. And, the chipped tooth period estimation unit 52 estimates the period ΔTute of the virtual unit angle interval, by subtracting a value obtained by multiplying this angle ratio Rθute to the difference average value ΔTdiffave from the average period ΔTutave of the virtual unit angle interval at the central angle of the chipped tooth section. If the number of chipped tooth M is one or more, and one or a plurality of virtual unit angle intervals are set in the chipped tooth section before the central angle of the chipped tooth section, the period is estimated about each virtual unit angle interval.

About chipped tooth section before central angle θcnt $$\Delta\theta ute = \theta cnt - \theta ute$$

$$\Delta\theta bf = \theta cnt - \theta bf$$

$$R\theta ute = \Delta\theta ute/\Delta\theta bf$$

$$\Delta Tute = \Delta Tutave - \Delta Tdiffave \times R\theta ute \tag{3}$$

And, about the chipped tooth section after the central angle θcnt of the chipped tooth section, as shown in the next equation and FIG. 6, the chipped tooth period estimation unit 52 calculates an angle ratio Rθute, by dividing an angular difference Δθute obtained by subtracting a central angle θute of the virtual unit angle interval for estimating a period from the central angle θcnt of the chipped tooth section, by an angular difference Δθaf obtained by subtracting the central angle θaf of the period after the chipped tooth section from the central angle θcnt of the chipped tooth section. And, the chipped tooth period estimation unit 52 estimates the period ΔTute of the virtual unit angle interval, by adding a value obtained by multiplying this angle ratio Rθute to the difference average value ΔTdiffave, to the average period ΔTutave of the virtual unit angle interval at the central angle of the chipped tooth section. If the number of chipped tooth M is one or more, and one or a plurality of virtual unit angle intervals are set in the chipped tooth section after the central angle of the chipped tooth section, the period is estimated about each virtual unit angle interval.

About chipped tooth section after central angle θcnt $$\Delta\theta ute = \theta cnt - \theta ute$$

$$\Delta\theta af = \theta cnt - \theta af$$

$$R\theta ute = \Delta\theta ute/\Delta\theta af$$

$$\Delta Tute = \Delta Tutave + \Delta Tdiffave \times R\theta ute \tag{4}$$

Herein, the central angle of each period is a center crank angle of the unit angle interval corresponding to each period. The estimation processing of the period ΔTute of the virtual unit angle interval is performed after the period ΔTaf after the chipped tooth section is detected. Each period ΔTute of the virtual unit angle interval is stored to the storage apparatus 91, such as RAM, correlating with the crank angle of the end of the corresponding virtual unit angle interval θd, and the angle identification number n.

If the number of chipped tooth M is an even number like the example of FIG. 6, the number of the virtual unit angle intervals set in the chipped tooth section becomes an odd number of M+1. Therefore, the central angle θcnt of the chipped tooth section becomes the central angle of the center virtual unit angle interval in the chipped tooth section, the period ΔTute of the center virtual unit angle interval is set to the average period ΔTutave of the virtual unit angle interval at the central angle. On the other hand, if the number of chipped tooth M is an odd number, the number of the virtual unit angle intervals set in the chipped tooth section becomes an even number of M+1. Therefore, the central angle θcnt of the chipped tooth section does not corresponds to any of the central angles of the virtual unit angle intervals, and the periods of all the virtual unit angle intervals are estimated using the equation (3) or the equation (4).

According to the above configuration, by adding or subtracting the difference average value ΔTdiffave, to the average period ΔTutave of the virtual unit angle interval at the central angle of the chipped tooth section, according to the angle ratio to the central angle of the chipped tooth section, the period ΔTute of each virtual unit angle interval can be estimated with good accuracy.

<Estimation Using Quadratic Function>

Alternatively, as explained in the following, the period ΔTute of the virtual unit angle interval may be estimated using a quadratic function. The chipped tooth period estimation unit 52 sets a period number i which increases or decreases one by one in order of increase in angle, to each of the period ΔTbf before the chipped tooth section, the periods ΔTute of one or a plurality of the virtual unit angle intervals in the chipped tooth section, and the period ΔTaf after the chipped tooth section.

Figure 7:
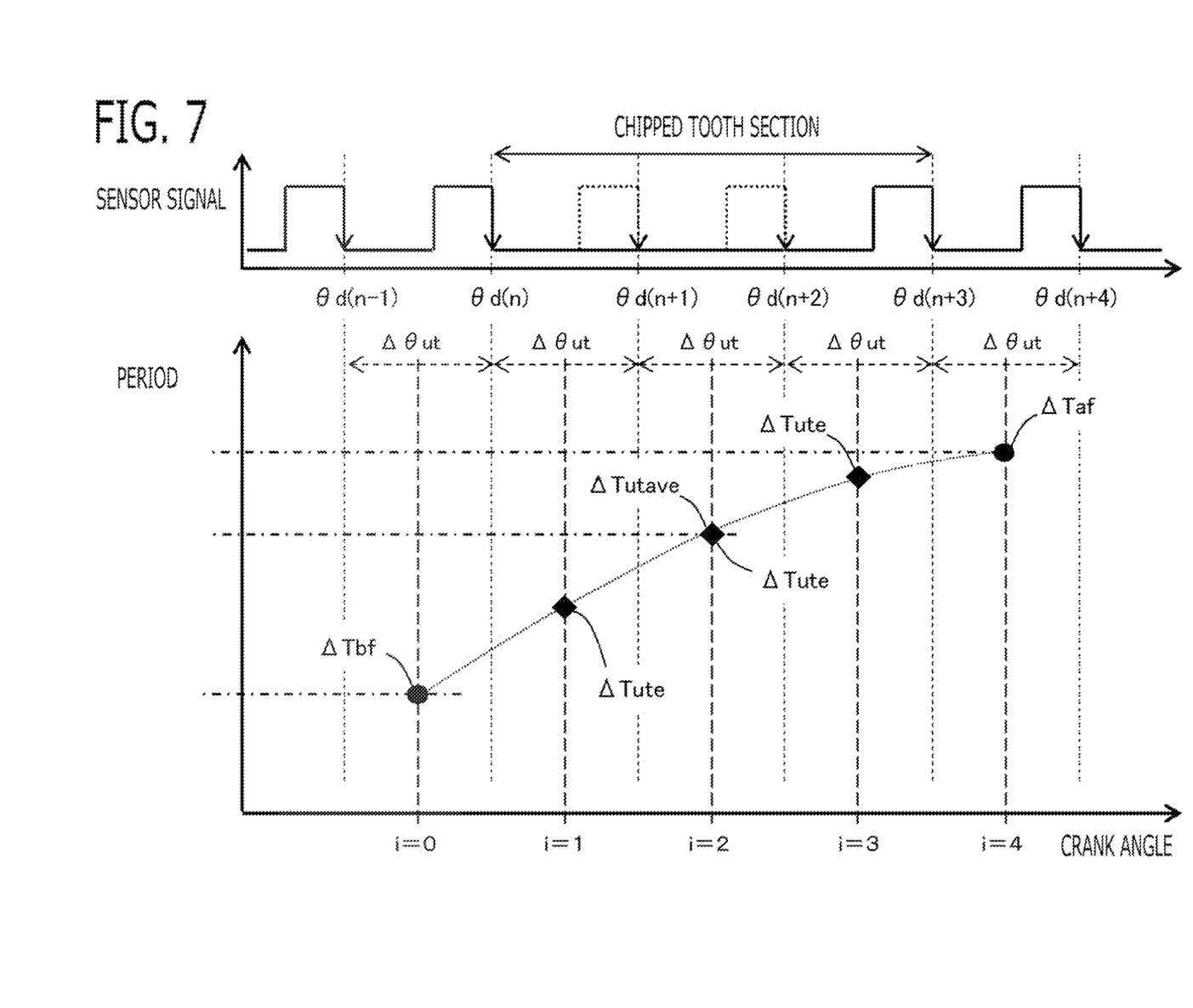
FIG. 7 is a figure for explaining the period estimation of the chipped tooth section according to Embodiment 1.

In the present embodiment, the period number i is increased one by one from 0 in order of increase in angle. As shown in FIG. 7, the chipped tooth period estimation unit 52 sets the period number i corresponding to period ΔTbf before the chipped tooth section to 0, sets the period number i corresponding to period ΔTute of the first virtual unit angle interval to 1, sets the period number i corresponding to period ΔTute of the second virtual unit angle interval to 2, sets the period number i corresponding to period ΔTute of the third virtual unit angle interval to 3, and sets the period number i corresponding to period ΔTaf after the chipped tooth section to 4. The period number i may be increased or decreased one by one from any number in order of increase in angle.

As shown in the next equation, the chipped tooth period estimation unit 52 sets a quadratic function in which the period number i is set as an independent variable, and the period ΔTut of the unit angle interval of each period number i is set as a dependent variable. Herein, "a" is a coefficient of the second-order term, "b" is a coefficient of the first-order term, and "c" is a coefficient of the zero-order term.

$$\Delta Tut(i) = a \times i^2 + b \times i + c \quad (5)$$

The chipped tooth period estimation unit 52 calculates the coefficients a, b, c of each order term of the quadratic function, based on the period ΔTbf before the chipped tooth section and the corresponding period number i=0, the average period ΔTutave of the virtual unit angle interval at the central angle of the chipped tooth section and the corresponding period number i=2, and the period ΔTaf after the chipped tooth section and the corresponding period number i=4.

As shown in the next equation, the chipped tooth period estimation unit 52 calculates the coefficients a, b, c of each order term, by solving three simultaneous equations in which these three samples are substituted in the equation (5).

$$\Delta Tbf = a \times 0^2 + b \times 0 + c \quad (6)$$
$$\Delta Tutave = a \times 2^2 + b \times 2 \times c$$
$$\Delta Taf = a \times 4^2 + b \times 4 + c$$
$$\begin{bmatrix} a \\ b \\ c \end{bmatrix} = \begin{bmatrix} 0^2 & 0 & 1 \\ 2^2 & 2 & 1 \\ 4^2 & 4 & 1 \end{bmatrix}^{-1} \begin{bmatrix} \Delta Tbf \\ \Delta Tutave \\ \Delta Taf \end{bmatrix}$$

Then, the chipped tooth period estimation unit 52 estimates the periods ΔTute of the one or the plurality of virtual unit angle intervals in the chipped tooth section, using the quadratic function with the calculated coefficients a, b, c of each order term. In the present embodiment, the chipped tooth period estimation unit 52 substitutes 1 for the period number i of the quadratic function, and calculates the period ΔTute of the first virtual unit angle interval; substitutes 2 for the period number i of the quadratic function, and calculates the period ΔTute of the second virtual unit angle interval; and substitutes 3 for the period number i of the quadratic function, and calculates the period ΔTute of the third virtual unit angle interval. In this example, since the period ΔTute of the second virtual unit angle interval coincides with the average period ΔTutave of the virtual unit angle interval at the central angle of the chipped tooth section, instead of calculating using the quadratic function, the average period ΔTutave of the virtual unit angle interval at the central angle of the chipped tooth section may be used.

If the number of chipped tooth M is an even number like the example of FIG. 7, the number of the virtual unit angle intervals set in the chipped tooth section becomes an odd number of M+1. Accordingly, the period number i corresponding to the average period ΔTutave of the virtual unit angle interval at the central angle of the chipped tooth section becomes the center period number i. On the other hand, if the number of chipped tooth M is an odd number, the number of the virtual unit angle intervals set in the chipped tooth section becomes an even number of M+1. Accordingly, the period number i corresponding to the average period ΔTutave of the virtual unit angle interval at the central angle of the chipped tooth section becomes a middle number of the center two period numbers i in the chipped tooth section. For example, if the number of chipped tooth M is 3, the period number i corresponding to the average period ΔTutave of the virtual unit angle interval at the central angle of the chipped tooth section becomes a middle number 2.5 of the center two period numbers i=2, i=3 in the chipped tooth section, and the middle number i=2.5 is substituted for the equation (6).

As described above, by the quadratic function using the period number i, the approximated curve which passes the period ΔTbf before the chipped tooth section, the average period ΔTutave of the virtual unit angle interval at the central angle θcnt of the chipped tooth section, and the period ΔTaf after the chipped tooth section is calculated, and the period ΔTute of each virtual unit angle interval can be estimated with good accuracy.

Alternatively, the chipped tooth period estimation unit 52 may estimate the period ΔTute of each virtual unit angle interval, by performing an linear interpolation according to an angle ratio of the angle of each virtual unit angle interval with respect to the chipped tooth section, between the period ΔTbf before the chipped tooth section and the period ΔTaf after the chipped tooth section.

1-2-3. Combustion State Estimation Unit 53

The combustion state estimation unit 53 estimates the combustion state of the internal combustion engine, based on the period ΔT of the unit angle interval detected in the section other than the chipped tooth section, and the period ΔTute of the virtual unit angle interval estimated in the chipped tooth section.

In the following, the period ΔT of the unit angle interval detected in the section other than the chipped tooth section and the period ΔTute of the virtual unit angle interval estimated in the chipped tooth section are not distinguished especially but are simply referred to as the period ΔTut of the unit angle interval.

The combustion state estimation unit 53 is provided with an angle information calculation unit 531, a gas pressure torque calculation unit 532, a cylinder pressure calculation unit 533, a combustion parameter calculation unit 534, and an unburning condition shaft torque learning unit 535.

1-2-3-1. Angle Information Calculation Unit 531

The angle information calculation unit 531 may perform a filter processing which reduces one or both of the component of high frequency, and the component of specific frequency, to the period ΔTut of the unit angle interval.

The angle information calculation unit 531 calculates the crank angle speed ωd which is a time change rate of the crank angle θd, and the crank angle acceleration αd which is a time change rate of the crank angle speed ωd, based on the period ΔTut of the unit angle interval.

Figure 8:
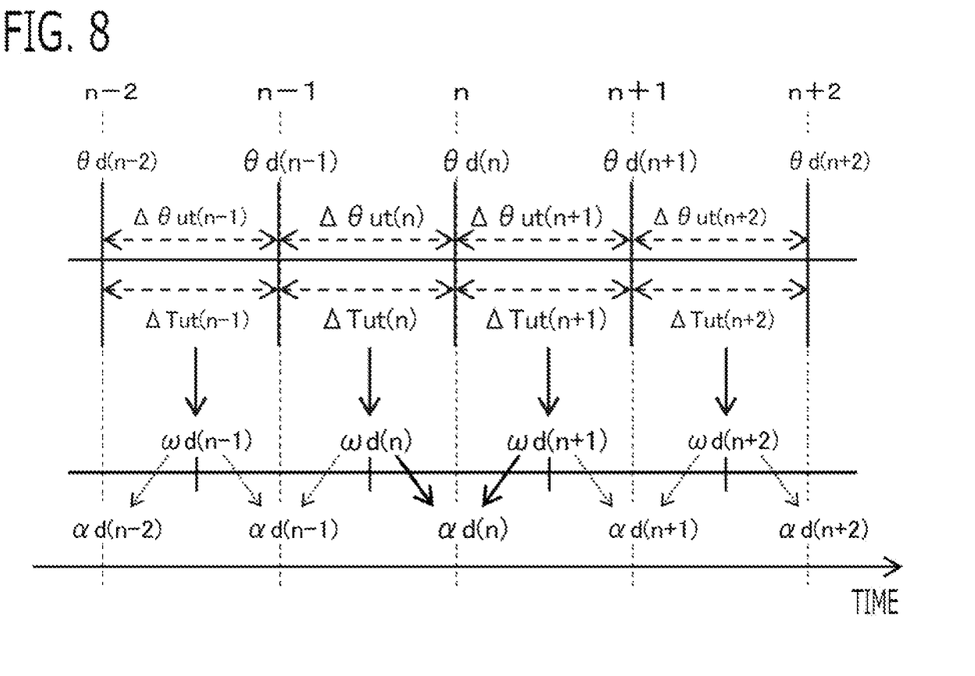
FIG. 8 is a time chart for explaining calculation of the angle speed and angle acceleration according to Embodiment 1.

In the present embodiment, as shown in FIG. 8, the angle information calculation unit 531 calculates the crank angle speed ωd (n) corresponding to the unit angle interval Δθut (n) of the processing object, based on the unit angle interval $\Delta\theta ut$ (n) and the period $\Delta Tut$ (n) of the unit angle interval which are set to the processing object. Specifically, the angle information calculation unit 531 calculates the crank angle speed $\omega d$ (n) by dividing the unit angle interval $\Delta\theta ut$ (n) of the processing object by the period $\Delta Tut$ (n) of the unit angle interval, as shown in the next equation. The unit angle interval $\Delta\theta ut$ is set to the same angle (in this example, 10 degrees).

$$\omega d(n) = \frac{\Delta\theta ut(n)}{\Delta Tut(n)} \times \frac{\pi}{180} \tag{7}$$

As shown in the next equation, based on the crank angle speed $\omega d$ (n) and the period $\Delta Tut$ (n) of the unit angle interval corresponding to the just before one unit angle interval $\Delta\theta ut$ (n) of the detected angle $\theta d$ (n) of the processing object, and the crank angle speed $\omega d$ (n+1) and the period $\Delta Tut$ (n+1) of the unit angle interval corresponding to the just after one unit angle interval $\Delta\theta ut$ (n+1) of the detected angle $\theta d$ (n) of the processing object, the angle information calculation unit 531 calculates the crank angle acceleration $\alpha d$ (n) corresponding to the detected angle $\theta d$ (n) of the processing object.

$$\alpha d(n) = \frac{\omega d(n+1) - \omega d(n)}{\Delta Tut(n+1) + \Delta Tut(n)} \times 2 \tag{8}$$

The crank angle speed $\omega d$ (n) and the crank angle acceleration $\alpha d$ (n) are stored in the storage apparatus 91, such as RAM, correlating with the corresponding angle identification number n and the crank angle $\theta d$.

1-2-3-2. Gas Pressure Torque Calculation Unit 532

The gas pressure torque calculation unit 532 calculates a gas pressure torque which is applied to the crankshaft by a gas pressure in cylinder, based on the crank angle acceleration $\alpha d$, at each crank angle of the arithmetic object.

In the present embodiment, the gas pressure torque calculation unit 532 calculates an increment of gas pressure torque by burning $\Delta Tgas\_brn$ which is included in the gas pressure torque. In the following, the calculation of the increment of gas pressure torque by burning $\Delta Tgas\_brn$ will be explained in detail.

<Calculation of Actual Shaft Torque Tcrkd>

The gas pressure torque calculation unit 532 calculates an actual shaft torque Tcrkd applied to the crankshaft, based on the crank angle acceleration $\alpha d$, at each crank angle $\theta d$ of the arithmetic object.

In the present embodiment, as shown in the next equation, the gas pressure torque calculation unit 532 calculates the actual shaft torque Tcrkd by multiplying the inertia moment Icrk of the crankshaft system to the crank angle acceleration $\alpha d$ at each crank angle $\theta d$.

$$Tcrkd = \alpha d \times Icrk \tag{9}$$

The inertia moment Icrk of the crankshaft system is an inertia moment of the whole member which rotates integrally with the crankshaft 2 (for example, the crankshaft 2, the crank 32, the flywheel 27, and the like), and is preliminarily set.

<Calculation of Shaft Torque in Unburning>

By referring to an unburning condition data in which a relationship between the crank angle $\theta d$ and the shaft torque in unburning Tcrk\_mot is set, the gas pressure torque calculation unit 532 calculates the shaft torque in unburning Tcrk\_mot corresponding to each crank angle $\theta d$ of the arithmetic object.

The unburning condition data is preliminarily set based on the experimental data, and is stored to the storage apparatus 91 such as ROM or EEPROM. In the present embodiment, the unburning condition data which is updated based on the actual shaft torque in unburning Tcrkd\_mot by the unburning condition shaft torque learning unit 535 described below is used.

The unburning condition data is set for every operating condition which influences at least the gas pressure in cylinder and the reciprocation inertia torque of the piston (for example, the rotational speed, the intake gas amount in cylinder, and the like). By referring to the unburning condition data corresponding to the present operating condition, the gas pressure torque calculation unit 532 calculates the shaft torque in unburning Tcrk\_mot corresponding to each crank angle $\theta d$.

<Calculation of External Load Torque>

The gas pressure torque calculation unit 532 calculates the actual shaft torque Tcrkd\_tdc based on the of the crank angle acceleration $\alpha d$, at the crank angle $\theta d\_tdc$ in the vicinity of the top dead center. By referring the unburning condition data, the gas pressure torque calculation unit 532 calculates the shaft torque in unburning Tcrk\_mot\_tdc corresponding to the crank angle $\theta d\_tdc$ in the vicinity of the top dead center. Herein, the vicinity of the top dead center is within an angle interval from 10 degrees before the top dead center to 10 degrees after the top dead center, for example. For example, the crank angle $\theta d\_tdc$ in the vicinity of the top dead center is preliminarily set to the crank angle of the top dead center.

The gas pressure torque calculation unit 532 calculates an external load torque Tload which is a torque applied to the crankshaft from the outside of the internal combustion engine, based on the actual shaft torque Tcrkd\_tdc and the shaft torque in unburning Tcrk\_mot\_tdc of the crank angle $\theta d\_tdc$ in the vicinity of the top dead center. In the present embodiment, as shown in the next equation, the gas pressure torque calculation unit 532 calculates the external load torque in burning Tload by subtracting the actual shaft torque in the vicinity of the top dead center Tcrkd\_tdc from the shaft torque in unburning Tcrk\_mot\_tdc in the vicinity of the top dead center.

$$Tload = Tcrk\_mot\_tdc - Tcrkd\_tdc \tag{10}$$

<Calculation of Increment of Gas Pressure Torque by Burning>

Figure 9:
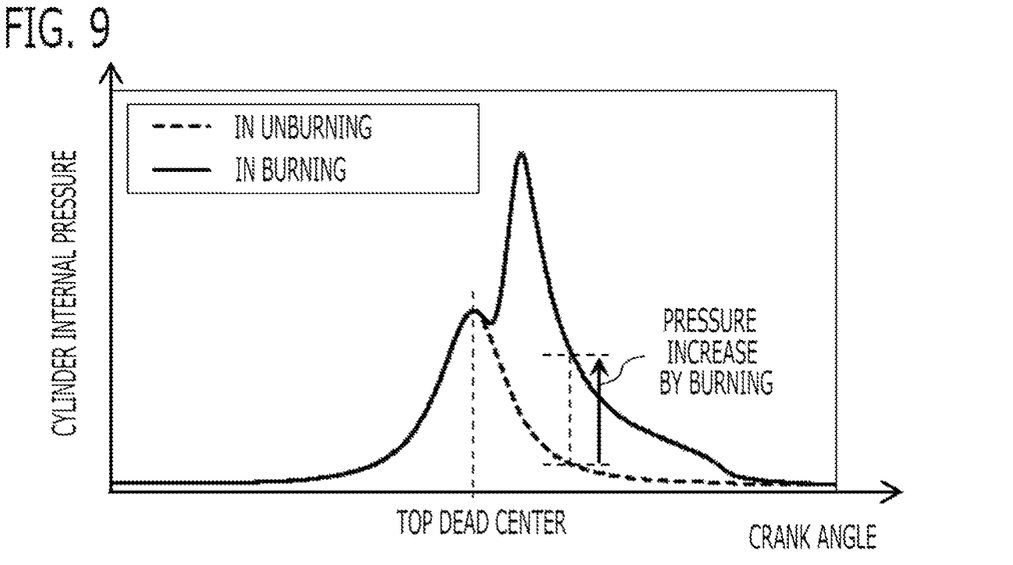
FIG. 9 is a figure for explaining the cylinder pressure in unburning and the cylinder pressure in burning according to Embodiment 1.

As shown in FIG. 9, the gas pressure in cylinder in burning increases by a pressure increase by burning more than the gas pressure in cylinder in unburning. The actual shaft torque in burning Tcrkd increases by an increment of shaft torque $\Delta Tgas\_brn$ generated by this pressure increment by burning more than the shaft torque in unburning Tcrk\_mot. Since this increment of shaft torque $\Delta Tgas\_brn$ is an increment of gas pressure torque generated by the gas pressure increase which is an increase from the gas pressure in cylinder in unburning to the gas pressure in cylinder in burning, it is referred to as an increment of gas pressure torque by burning $\Delta Tgas\_brn$.

The gas pressure torque calculation unit 532 calculates the increment of gas pressure torque by burning $\Delta Tgas\_brn$, based on the actual shaft torque Tcrkd, the shaft torque in unburning Tcrk\_mot, and the external load torque Tload, at each crank angle $\theta d$ of the arithmetic object. In the present embodiment, as shown in the next equation, the gas pressure torque calculation unit 532 calculates the increment of gas pressure torque by burning ΔTgas_brn, by subtracting the shaft torque in unburning Tcrk_mot from the actual shaft torque Tcrkd, and adding the external load torque Tload.

$$\Delta T\text{gas\_brn} = T\text{crkd} - T\text{crk\_mot} + T\text{load} \qquad (11)$$

The actual shaft torque Tcrkd, the shaft torque in unburning Tcrk_mot, and the increment of gas pressure torque by burning ΔTgas_brn are stored in the storage apparatus 91, such as RAM, correlating with the corresponding angle identification number n and the crank angle θd.

1-2-3-3. Cylinder Pressure Calculation Unit 533

The cylinder pressure calculation unit 533 estimates the combustion state of the internal combustion engine, based on the gas pressure torque by burning. In the present embodiment, the cylinder pressure calculation unit 533 estimates the combustion state of the internal combustion engine, based on the increment of gas pressure torque by burning ΔTgas_brn.

<Calculation of Gas Pressure in Cylinder in Unburning>

At each crank angle θd of the arithmetic object, the cylinder pressure calculation unit 533 calculates a gas pressure in cylinder in unburning Pcyl_mot when assuming that it is unburning, based on the current condition of the intake gas amount in cylinder (in this example, the current gas pressure in intake pipe Pin).

In the present embodiment, the cylinder pressure calculation unit 533 calculates the gas pressure in cylinder in unburning Pcyl_mot, using the next equation expressing the polytropic change.

$$\text{Pcyl\_mot} = \left(\frac{V\text{cyl}0}{V\text{cyl\_}\theta}\right)^{N\text{ply}} \times Pin \qquad (12)$$

$$V\text{cyl\_}\theta = V\text{cyl}0 - Sp \times r\left\{(1 + \cos(\theta d)) - \frac{r}{L}(1 + \cos(2 \times \theta d))\right\}$$

Herein, Nply is a polytropic index, and a preliminarily set value is used. Vcyl0 is the cylinder volume of the combustion cylinder at valve closing of the intake valve. Sp is a projection area of the top face of the piston. r is the crank length. L is the length of the connecting rod. As the crank angle θd used for the calculation of the trigonometric function, the angle that the top dead center of the compression stroke of the burning cylinder is set to 0 degree is used.

<Calculation of Gas Pressure in Cylinder in Burning>

Then, at each crank angle θd of the arithmetic object, the cylinder pressure calculation unit 533 calculates the gas pressure in cylinder in burning Pcyl_brn, based on the gas pressure in cylinder in unburning Pcyl_mot and the increment of gas pressure torque by burning ΔTgas_brn.

In the present embodiment, at each crank angle θd of the arithmetic object, the cylinder pressure calculation unit 533 calculates an increment of gas pressure in cylinder by burning ΔPcyl_brn, based on the increment of gas pressure torque by burning ΔTgas_brn. For example, the cylinder pressure calculation unit 533 calculates the increment of gas pressure in cylinder by burning ΔPcyl_brn using the next equation.

$$\Delta P\text{cyl\_brn} = \frac{\Delta T\text{gas\_brn}}{Sp \times R\_\text{brn}} \qquad (13)$$

$$R\_\text{brn} = r\left\{\sin(\theta d) - \frac{1}{2}\frac{r}{L}\cos(2 \times \theta d)\right\}$$

Then, as shown in the next equation, at each crank angle θd of the arithmetic object, the cylinder pressure calculation unit 533 calculates the gas pressure in cylinder in burning Pcyl_brn, by adding the gas pressure in cylinder in unburning Pcyl_mot and the increment of gas pressure in cylinder by burning ΔPcyl_brn.

$$P\text{cyl\_brn} = P\text{cyl\_mot} + \Delta P\text{cyl\_brn} \qquad (14)$$

The gas pressure in cylinder in burning Pcyl_brn is stored to the storage apparatus 91, such as RAM, correlating with the corresponding angle identification number n and the crank angle θd.

1-2-3-4. Combustion Parameter Calculation Unit 534

The combustion parameter calculation unit 534 calculates a combustion parameter showing the combustion state, based on the gas pressure in cylinder in burning Pcyl_brn of each crank angle θd of the arithmetic object. For example, at least one or more of a heat release rate, a mass combustion rate MFB, and an indicated mean effective pressure IMEP are calculated as the combustion parameter. Other kind of combustion parameter may be calculated.

In the present embodiment, using the next equation, the combustion parameter calculation unit 534 calculates the heat release rate dQ/dθd per unit crank angle at each crank angle θd of the arithmetic object.

$$\frac{d(Q)}{d(\theta d)} = \qquad (15)$$

$$\frac{\kappa}{\kappa - 1} P\text{cyl\_brn} \frac{d(V\text{cyl\_}\theta)}{d(\theta d)} + \frac{1}{\kappa - 1} V\text{cyl\_}\theta \frac{d(P\text{cyl\_brn})}{d(\theta d)}$$

Herein, κ is a ratio of specific heat. Vcly_θ is a cylinder volume of the combustion cylinder at each crank angle θd, and is calculated as explained using the second equation of the equation (12). At each crank angle θd of the arithmetic object, the combustion parameter calculation unit 534 performs a calculation processing which calculates the heat release rate dQ/dθd. The calculated heat release rate dQ/dθd of each crank angle θd is stored to the storage apparatus 91, such as RAM, similar to other calculation values.

Using the next equation, the combustion parameter calculation unit 534 calculates the mass combustion rate MFB of each crank angle θd of the arithmetic object, by dividing a section integral value obtained by integrating the heat release rate dQ/dθd from the start angle θ0 of the arithmetic object to each crank angle θd of the arithmetic object, by an all integral value Q0 obtained by integrating the heat release rate dQ/dθd for over the whole estimation crank angle interval θint. At each crank angle θd of the arithmetic object, the combustion parameter calculation unit 534 performs a calculation processing which calculates the mass combustion rate MFB. The calculated mass combustion rate MFB of each crank angle θd is stored to the storage apparatus 91, such as RAM, similar to other calculation values.

$$MFB = \frac{\int_{\theta 0}^{\theta d\_obj} \frac{d(Q)}{d(\theta d)} d(\theta d)}{Q0} \qquad (16)$$

About each combustion cylinder, using the next equation, the combustion parameter calculation unit 534 calculates the indicated mean effective pressure IMEP by integrating the gas pressure in cylinder in burning Pcyl_brn with respect to the cylinder volume Vcly_θ of the combustion cylinder.

$$IMEP = \frac{1}{Vcylall} \int_{Vcyls}^{Vcyle} \text{Pcyl\_brn } d(\text{Vcyl\_}\theta) \qquad (17)$$

Herein, Vcylall is a stroke volume, Vcyls is a cylinder volume at integral start, and Vclye is a cylinder volume at integral end. The volume interval for integration may be set to a volume interval corresponding to at least the estimation crank angle interval θint, or may be set to a volume interval corresponding to the four cycles. Vcly_θ is calculated based on the crank angle θd, as shown in the second equation of the equation (12). At each crank angle θd of the arithmetic object, the combustion parameter calculation unit 534 performs integration processing of the gas pressure in cylinder in burning Pcyl_brn.

1-2-3-5. Unburning Condition Shaft Torque Learning Unit 535

In the unburning condition of the internal combustion engine, at each crank angle θd, the unburning condition shaft torque learning unit 535 calculates the actual shaft torque Tcrkd based on the crank angle acceleration αd similar to the burning condition, and updates the unburning condition data by the calculated actual shaft torque in unburning Tcrkd.

For example, the unburning condition for updating the unburning condition data is a condition where the fuel cut is carried out, or a condition where the internal combustion engine is driven by the driving force from the outside of the internal combustion engine (for example, driving force of the motor, driving force transmitted from the wheels) in the unburning condition.

In the present embodiment, the unburning condition shaft torque learning unit 535 refers to the unburning condition data stored in the storage apparatus 91 and reads out the shaft torque in unburning Tcrk_mot corresponding to the crank angle θd of the update object; and changes the shaft torque in unburning Tcrk_mot of the crank angle θd of the update object which is set in the unburning condition data stored in the storage apparatus 91, so that the read shaft torque in unburning Tcrk_mot approaches the actual shaft torque in unburning Tcrkd_mot calculated at the crank angle θd of the update object.

1-2-4. Combustion Control Unit 54

The combustion control unit 54 performs a combustion control which changes at least one or both of the ignition timing and the EGR amount, based on the estimated combustion state (in this example, the combustion parameter).

In the present embodiment, the combustion control unit 54 determines a crank angle θd at which the mass combustion rate MFB becomes 0.5 (50%) (referred to as a combustion central angle), and changes at least one or both of the ignition timing and the EGR amount so that the combustion central angle approaches a preliminarily set target angle. For example, when the combustion central angle is on the retard angle side than the target angle, the combustion control unit 54 changes the ignition timing to the advance angle side, or decreases the opening degree of the EGR valve 22 so as to decrease the EGR amount. When the EGR amount is decreased, a combustion speed becomes fast and the combustion central angle changes to the advance angle side. On the other hand, when the combustion central angle is on the advance angle side than the target angle, the combustion control unit 54 changes the ignition timing to the retard angle side, or increases the opening degree of the EGR valve 22 so as to increase the EGR amount.

Alternatively, the combustion control unit 54 may determine a crank angle θd at which the heat release rate dQ/dθd becomes a maximum value, and change at least one or both of the ignition timing and the EGR amount so that this crank angle θd approaches a preliminarily set target angle.

Alternatively, the combustion control unit 54 may changes at least one or both of the ignition timing and the EGR amount so that the indicated mean effective pressure IMEP approaches a target value which is set for every operating condition.

Other control parameters (for example, the opening and closing timing of the intake valve, the opening and closing timing of the exhaust valve) related to the combustion state may be changed.

Although the present disclosure is described above in terms of an exemplary embodiment, it should be understood that the various features, aspects and functionality described in the embodiment are not limited in their applicability to the particular embodiment with which they are described, but instead can be applied, alone or in various combinations to the embodiment. It is therefore understood that numerous modifications which have not been exemplified can be devised without departing from the scope of the present disclosure. For example, at least one of the constituent components may be modified, added, or eliminated.

What is claimed is:

1. A controller for an internal combustion engine that controls the internal combustion engine which is provided with a detected unit which has a plurality of teeth at a preliminarily set unit angle interval with a chipped tooth section and rotates integrally with a crankshaft, and a crank angle sensor which detects a tooth among the plurality of teeth, the controller for the internal combustion engine, comprising at least one processor configured to:
   detect a period when the tooth passes, based on an output signal of the crank angle sensor, determine a period corresponding to the chipped tooth section, and determine a crank angle corresponding to the passed tooth;
   where virtual unit angle intervals refer to intervals between chipped teeth that are assumed to be provided in the chipped tooth section, among the plurality of teeth, and corresponds to a value greater than a number of the chipped teeth by 1;
   wherein the at least one processor is further configured to:
   calculate an average period of the virtual unit angle intervals in the chipped tooth section, by dividing the period of the chipped tooth section by a value obtained by adding 1 to the number of the chipped teeth;
   make the average period of the virtual unit angle intervals correspond to a central angle of the chipped tooth section;
   estimate a period of each of the virtual unit angle intervals in the chipped tooth section based on the period corresponding to the chipped tooth section, a period before the chipped tooth section, and a period after the chipped tooth section, by an approximate line which passes the period before the chipped tooth section, the average period of the virtual unit angle intervals at the central angle of the chipped tooth section, and the period after the chipped tooth section; and
   control one or both of an ignition timing and an EGR amount of the internal combustion engine based on the estimated period of each of the virtual unit angle intervals.

2. The controller for the internal combustion engine according to claim 1, wherein the at least one processor calculates a former difference by subtracting the average period of the virtual unit angle intervals at the central angle of the chipped tooth section from the period before the chipped tooth section; calculates a later difference by subtracting the period after the chipped tooth section from the average period of the virtual unit angle intervals at the central angle of the chipped tooth section; and calculates a difference average value of the former difference and the later difference, in estimating the period of each of the virtual unit angle intervals before the central angle of the chipped tooth section, calculates a first angle ratio, by dividing a first angular difference obtained by subtracting a central angle of the virtual unit angle interval for estimating the period from the central angle of the chipped tooth section, by a second angular difference obtained by subtracting a central angle of the period before the chipped tooth section from the central angle of the chipped tooth section; and estimates the period of the virtual unit angle interval, by subtracting a value obtained by multiplying the first angle ratio to the difference average value, from the average period of the virtual unit angle intervals at the central angle of the chipped tooth section, in estimating the period of each of the virtual unit angle intervals after the central angle of the chipped tooth section, calculates a second angle ratio by dividing a third angular difference obtained by subtracting a central angle of the virtual unit angle interval for estimating the period from the central angle of the chipped tooth section, by a fourth angular difference obtained by subtracting a central angle of the period after the chipped tooth section from the central angle of the chipped tooth section; and estimates the period of the virtual unit angle interval, by adding a value obtained by multiplying the second angle ratio to the difference average value, to the average period of the virtual unit angle intervals at the central angle of the chipped tooth section.

3. The controller for the internal combustion engine according to claim 1, wherein the at least one processor sets a period number which increases one by one from 0 in order of increase in angle, to each of the period before the chipped tooth section, the periods of the virtual unit angle intervals in the chipped tooth section, and the period after the chipped tooth section;

calculates a coefficient of each order term of a quadratic function in which the period number is set as an independent variable, and the periods of the virtual unit angle intervals is set as a dependent variable, based on the period before the chipped tooth section and its corresponding period number, the average period of the virtual unit angle intervals at the central angle of the chipped tooth section and its corresponding period number, and the period after the chipped tooth section and its corresponding period number; and estimates the periods of the virtual unit angle intervals in the chipped tooth section, using the quadratic function which has the calculated coefficient of each order.

* * * * *